US010566159B2

(12) United States Patent
Mantilla et al.

(10) Patent No.: US 10,566,159 B2
(45) Date of Patent: Feb. 18, 2020

(54) APPARATUS FOR THE GENERATION, TRANSMISSION, DISTRIBUTION AND/OR THE USAGE OF ELECTRICAL ENERGY, IN PARTICULAR ELECTRICAL SWITCHING DEVICE

(71) Applicant: ABB Schweiz AG, Baden (CH)

(72) Inventors: Javier Mantilla, Baden (CH); Max Claessens, Untersiggenthal (CH); Ryan-Gerald Anderson, Asheboro, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/154,767

(22) Filed: Oct. 9, 2018

(65) Prior Publication Data

US 2019/0051476 A1 Feb. 14, 2019

Related U.S. Application Data

(63) Continuation of application No. PCT/EP2017/057836, filed on Apr. 3, 2017.

(30) Foreign Application Priority Data

Apr. 6, 2016 (EP) ..................................... 16164016

(51) Int. Cl.
*H01H 33/22* (2006.01)
*H01H 33/70* (2006.01)
(Continued)

(52) U.S. Cl.
CPC ........ *H01H 33/7076* (2013.01); *B01J 23/002* (2013.01); *B01J 23/63* (2013.01);
(Continued)

(58) Field of Classification Search
CPC .... H01H 33/22; H01H 33/91; H01H 33/7076; H01H 2033/566; B01J 23/002;
(Continued)

(56) References Cited

U.S. PATENT DOCUMENTS 7,816,618 B2 * 10/2010 Uchii ..................... H01H 33/56
218/43
8,389,886 B2 * 3/2013 Dahlquist .............. H01H 33/74
218/45

(Continued)

FOREIGN PATENT DOCUMENTS

EP 2779195 A1 9/2014
JP 2015073348 A 4/2015

OTHER PUBLICATIONS

Translation of JP2015073348 (original document published Apr. 16, 2015) (Year: 2015).*

(Continued)

*Primary Examiner* — Edwin A. Leon
*Assistant Examiner* — William A Bolton
(74) *Attorney, Agent, or Firm* — Taft Stettinius & Hollister LLP; J. Bruce Schelkopf (57) ABSTRACT

The present application relates to an apparatus for the generation, transmission, distribution and/or usage of electrical energy, the apparatus including a housing enclosing an insulation space and an electrically conductive part arranged in the insulation space, wherein the insulating space contains a dielectric fluid including carbon dioxide and oxygen. In the apparatus an oxidation catalyst is arranged that includes noble metal particles coated onto or embedded into a carrier and serves for the catalytic oxidation of carbon monoxide to carbon dioxide.

22 Claims, 2 Drawing Sheets

(51) Int. Cl.
  *B01J 23/00* (2006.01)
  *B01J 23/63* (2006.01)
  *B01J 23/89* (2006.01)
  *B01J 35/00* (2006.01)
  *H01H 33/56* (2006.01)
  *H02B 13/055* (2006.01)

(52) U.S. Cl.
  CPC ......... *B01J 23/894* (2013.01); *B01J 23/8906* (2013.01); *B01J 35/006* (2013.01); *H01H 33/22* (2013.01); *B01J 2523/00* (2013.01); *H01H 2033/566* (2013.01); *H02B 13/055* (2013.01)

(58) Field of Classification Search
  CPC .. B01J 23/38; B01J 23/638906; B01J 23/894; B01J 35/006
  USPC .............................. 218/1, 51, 57, 59, 61, 85
  See application file for complete search history.

(56) References Cited

U.S. PATENT DOCUMENTS

| | | | | |
|---|---|---|---|---|
| 8,674,253 | B2* | 3/2014 | Uchii | H01F 27/321 |
| | | | | 218/59 |
| 9,899,167 | B2* | 2/2018 | Florez | H01H 33/22 |
| 2012/0085735 | A1 | 4/2012 | Uchii et al. | |
| 2014/0263187 | A1* | 9/2014 | Yamada | H01H 33/765 |
| | | | | 218/63 |

OTHER PUBLICATIONS

European Patent Office, International Search Report & Written Opinion issued in corresponding Application No. PCT/EP2017/057836, dated May 12, 2017, 13 pp.

European Patent Office, International Preliminary Report on Patentability issued in corresponding Application No. PCT/EP2017/057836, dated Jun. 11, 2018, 19 pp.

European Patent Office, Search Report issued in corresponding Application No. 16164016.4, completed Sep. 27, 2016, 7 pp.

* cited by examiner

APPARATUS FOR THE GENERATION, TRANSMISSION, DISTRIBUTION AND/OR THE USAGE OF ELECTRICAL ENERGY, IN PARTICULAR ELECTRICAL SWITCHING DEVICE

The present invention relates to an apparatus for the generation, the transmission, the distribution and/or the usage of electrical energy, in particular to an electrical switching device. The invention further relates to the use of an oxidation catalyst comprising noble metal particles coated onto or embedded into a carrier for the catalytic oxidation of carbon monoxide to carbon dioxide in such an apparatus, particularly in a switching device, more particularly in a circuit breaker, and specifically in a high voltage circuit breaker.

In conventional circuit breakers, the arc formed during a current breaking operation is extinguished using a dielectric gas, which thus functions as an "arc-extinction gas" (also referred to as "arc-quenching gas" or "switching gas").

For this purpose, the circuit breaker comprises one or more series-connected switching chambers, which are filled with the arc-extinction gas and operate on one of the conventional principles for extinguishing the arc generated in the arcing region, e.g. by way of e.g. a self-blasting mechanism or conventional puffer assisted mechanism.

EP 0 836 209, for example, discloses a circuit breaker comprising a switching chamber filled with the arc-extinction gas. During the breaking operation, an arc is generated between the two main contacts and is quenched by the arc-extinction gas. The hot and ionized gases which are produced in the arcing region are transported downstream, i.e. in direction to an exhaust volume, with a portion of the hot gases being stored in a self-blast volume and being used later in a known manner to assist the quenching process. The remaining hot gases are transported through the tubular main arcing contacts into an exhaust volume.

Typically, sulphur hexafluoride ($SF_6$) is used as arc-extinction gas. $SF_6$ is stable, harmless and nonflammable and has outstandingly high dielectric insulating capabilities as well as arc extinguishing capabilities. Despite of these properties, efforts to look for an alternative dielectric fluid have nevertheless been intensified, in particular in view of a lower Global Warming Potential (GWP) than the one of $SF_6$.

For example, US 2012/0085735 discloses a gas circuit breaker using $CO_2$ as insulation gas. A replacement of $SF_6$ by $CO_2$ as insulation gas for electric power transmission/distribution and transformation devices is further suggested in EP 2 779 195.

Both US 2012/0085735 and EP 2 779 195 discuss the problem that in the case where $CO_2$ is used as insulation gas, CO is generated due to dissociation of $CO_2$, in particular during arcing. In contrast to the dissociation products of $SF_6$, CO is not readily recombined to $CO_2$, thus leading to a decrease of the insulation or arc-extinction performance of the gas over time. In addition, CO is accumulated, which—because of its high toxicity and flammability—raises serious safety concerns. Hence, it is desirable to remove and control the concentration of CO inside the apparatus.

In order to suppress a reduction in the insulation or arc-extinguishing performance in a gas insulated apparatus using an insulation gas containing $CO_2$, US 2012/0085735 suggests the use of a zeolite arranged in the insulation gas. According to US 2012/0085735, the zeolite shall adsorb CO and thus suppress the increase in the concentration of CO gas in the vessel. In the preferred case where $CO_2$ molecules are adsorbed to the zeolite before use of the circuit breaker, the adsorption of CO molecules leads according to US 2012/0085735 to a molecular exchange with pre-adsorbed $CO_2$ molecules, which are thereby released and thus compensate for the dissociated $CO_2$ molecules. In practice however, the molecular exchange suggested in US 2012/0085735 has turned out to be impracticable, since $CO_2$ exhibits a stronger adsorption to the zeolite than CO.

In addition to US 2012/0085735, also JP 2014 124053 attempts to lower the amount of CO by adsorption and to this end suggests an adsorber to be arranged, which selectively adsorbs CO.

Alternatively, EP 2 779 195 suggests the use of a metallic oxide at a portion contacting the hot stream, which is generated by the arc. Specifically, the metallic oxide acts as an oxidizer for oxidizing CO to $CO_2$. However, the oxidizing capacity of the metallic oxide decreases over time, due to the metallic oxide being reduced and thus being consumed. In order to guarantee a safe operation of the apparatus, the presence and oxidizing capacity of the metallic oxide must be checked regularly and be replaced, if need arises.

JP 2014 200155 deals with the problem of CO being generated in a gas-insulated switchgear using $CO_2$ as arc-extinction gas and, in this regard, suggests an oxidizing layer to be provided, which is in contact with the CO gas generated by the arc.

The problem of reducing the amount of carbon monoxide generated during an arcing event is further addressed in JP2015 073348, which suggests to use carbon dioxide as an insulation gas and to guide the insulation gas out of the insulation space into an adsorption vessel or a reaction vessel separate from the insulation space. Then, carbon monoxide is adsorbed or oxidized into carbon dioxide in the adsorption vessel or in the reaction vessel, respectively, and thus outside of the insulation space of the electrical apparatus.

In consideration of the above mentioned shortcomings, the problem of the present invention is therefore to provide an apparatus for the generation, transmission, distribution and/or usage of electrical energy, which allows suppressing the accumulation of CO over a prolonged period of time in a simple and safe manner.

In the specific case of an electrical switching device, in which $CO_2$ is used as the arc-extinction medium or as a part of the arc-extinction medium, the switching device shall allow to maintain the $CO_2$ concentration in the arc-extinction medium and thus to preserve its insulation and arc-extinguishing performance.

In particular in view of the technology described in EP 2 779 195, the above mentioned object shall be achievable without altering or consuming the material of the apparatus.

The problem is solved by the apparatus or use of catalyst according to the independent claims. Preferred embodiments of the invention are defined in the dependent claims or claim combinations.

According to claim 1, the invention thus relates to an apparatus for the generation, transmission, distribution and/or usage of electrical energy, said apparatus comprising a housing enclosing an insulating space and an electrically conductive part arranged in the insulating space. The insulating space contains a dielectric fluid comprising carbon dioxide and oxygen. The apparatus is characterized in that in the apparatus an oxidation catalyst is arranged comprising noble metal particles coated onto or embedded into a carrier and serving for the catalytic oxidation of carbon monoxide to carbon dioxide. In particular, the catalytic oxidation takes place during operation of the apparatus or under operating conditions of the apparatus.

Specifically, the oxidation catalyst is therefore arranged inside the insulation space of the apparatus, more specifically in a manner such as to allow a direct contact with the insulation fluid contained in the insulation space. Thus, both carbon monoxide and oxygen contained in the insulation fluid can bind to the oxidation catalyst, thereby allowing catalysis of the oxidation of carbon monoxide to carbon dioxide to take place directly in the insulation space of the electrical apparatus.

In comprising an oxidation catalyst arranged in the insulation space and, thus, in direct contact to the dielectric fluid, which apart from carbon dioxide also comprises oxygen, the present invention is in clear distinction from the technology described in JP 2015 073348, according to which insulation gas is forced to flow out of the insulation space into a reaction vessel separate from the insulation space. According to a preferred embodiment of the present invention, the electrical apparatus is therefore devoid of a reaction vessel being separate from the insulation space and being designed specifically for the oxidation from carbon monoxide to carbon dioxide to take place.

Further, in having an oxidation catalyst, which comprises noble metal particles, the apparatus of the present invention is also in clear contrast to the technology described in JP 2014 200155, which makes use of an oxidizing agent layer containing Mn, Co, Ni, Cu, Zn, Ti, Fe, V or Cr, i.e. non-noble metals. Also JP 2016 063579, which has a publication date after the priority date of the present application, discloses an oxidizing agent layer containing Mn, Co, Ni, Cu, Zn, Ti, Fe, V or Cr, but not an oxidation catalyst comprising noble metal particles.

According to a specific embodiment of the present invention, the oxidation catalyst is devoid of an oxidizing agent layer containing Mn, Co, Ni, Cu, Zn, Ti, Fe, V or Cr.

According to an embodiment, the apparatus of the present invention is an electrical switching device. Thus in particular, the present invention relates to an electrical switching device comprising at least one switching chamber, which comprises at least two arcing contacts movable in relation to each other and defining an arcing region between them, in which arcing region an arc is formed during a current breaking operation, with at least a portion of said switching chamber being filled with a dielectric fluid for quenching the arc and for providing dielectric insulation, said dielectric fluid comprising carbon dioxide and oxygen, characterized in that in the switching device an oxidation catalyst is arranged and comprises noble metal particles that are coated onto or are embedded into a carrier and serve for the catalytic oxidation of carbon monoxide to carbon dioxide. In particular, the catalytic oxidation takes place during operation of the electrical switching device or under operating conditions of the electrical switching device.

Depending on its primary function, the dielectric fluid forms an insulation fluid and/or an arc-extinction fluid.

Typically, the dielectric fluid comprises at least one dielectric compound in combination with a carrier gas.

As mentioned above, the dielectric fluid comprises carbon dioxide and oxygen. Whereas oxygen is a component of the carrier gas, carbon dioxide can function both as dielectric compound of the fluid or as a component of the carrier gas.

In deliberately adding oxygen to the dielectric fluid, in particular in the amounts specified in further detail below, for preventing soot formation during arcing, the present invention is in clear distinction to an electrical apparatus as disclosed in JP 2015 073348, according to which oxygen may only be present as a by-product of $CO_2$ dissociation and is destined to be consumed by reacting with a metal contained in the housing to the respective metal oxide.

In case that $CO_2$ is a carrier gas component, the dielectric fluid further comprises a dielectric compound, such as $SF_6$ and/or an organofluorine compound. In embodiments, the organofluorine compound is at least one compound selected from the group consisting of: fluoroethers, in particular hydrofluoromonoethers, fluoroketones, in particular perfluoroketones, fluoroolefins, in particular hydrofluoro-olefins, fluoronitriles, in particular perfluoronitriles, and mixtures thereof.

In further embodiments, the organofluorine compound is a fluoroketone containing from four to twelve carbon atoms, preferably containing exactly five carbon atoms or exactly six carbon atoms or mixtures thereof. Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds between carbon atoms.

The at least partially fluorinated alkyl chain of the fluoroketones can be linear or branched, or can form a ring, which optionally is substituted by one or more alkyl groups. In exemplary embodiments, the fluoroketone is a perfluoroketone. In further exemplary embodiments, the fluoroketone has a branched alkyl chain, in particular an at least partially fluorinated alkyl chain. In still further exemplary embodiments, the fluoroketone is a fully saturated compound.

In additional or alternative embodiments, the organofluorine compound is a hydrofluoroether selected from the group consisting of: hydrofluoro monoether containing at least three carbon atoms; hydrofluoro monoether containing exactly three or exactly four carbon atoms; hydrofluoro monoether having a ratio of number of fluorine atoms to total number of fluorine and hydrogen atoms of at least 5:8; hydrofluoro monoether having a ratio of number of fluorine atoms to number of carbon atoms ranging from 1.5:1 to 2:1; pentafluoro-ethyl-methyl ether; 2,2,2-trifluoroethyl-trifluoro-methyl ether; and mixtures thereof.

The organofluorine compound can also be a fluoroolefin, in particular a hydrofluoroolefin. More particularly, the fluoroolefin or hydrofluoroolefin, respectively, contains at least three carbon atoms or contains exactly three carbon atoms. According to further embodiments, the hydrofluoroolefin is thus selected from the group consisting of: 1,1,1,2-tetrafluoropropene (HFO-1234yf; also named 2,3,3,3-tetrafluoro-1-propene), 1,2,3,3-tetrafluoro-2-propene (HFO-1234yc), 1,1,3,3-tetrafluoro-2-propene (HFO-12342c), 1,1,1,3-tetrafluoro-2-propene (HFO-1234ze), 1,1,2,3-tetrafluoro-2-propene(HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetra-fluoropropene (HFO-1234zeZ); also named cis-1,3,3,3-tetra-fluoro-1-propene), (Z)1,1,2,3-tetrafluoro-2-propene (HFO-1234yeZ), (E)1,1,1,3-tetrafluoropropene (HFO-1234zeE; also named trans-1,3,3,3-tetrafluoro-1-propene), (E)1,1,2,3-tetra-fluoro-2-propene (HFO- 1234yeE), (Z)1,1,1,2,3-pentafluoro-propene (HFO-1225yeZ; also named cis-1,2,3,3,3 pentafluoro-prop-1-ene), (E)1,1,1,2,3-pentafluoropropene (HFO-1225yeE; also named trans-1,2,3,3,3 pentafluoroprop-1-ene); and mixtures thereof.

As mentioned above, the organofluorine compound can also be a fluoronitrile, in particular a perfluoronitrile, despite of its relatively poor environmental safety. In particular, the organofluorine compound can be a fluoronitrile, specifically a perfluoronitrile, containing two carbon atoms, three carbon atoms or four carbon atoms. More particularly, the fluoronitrile can be a perfluoroalkylnitrile, specifically perfluoroacetonitrile, perfluoropropionitrile ($C_2F_5CN$) and/or perfluorobutyronitrile ($C_3F_7CN$). Most particularly, the fluoronitrile can be perfluoroisobutyronitrile (according to the formula $(CF_3)_2CFCN$) and/or perfluoro-2-methoxypropane-nitrile (according to the formula $CF_3CF(OCF_3)CN$). Of these, perfluoroisobutyronitrile is particularly preferred due to its relatively low toxicity.

During use of the apparatus, CO is formed. CO formation is particularly pronounced in a switching device, namely during extinction of the arc that is generated. as a result of the switching operation. In this case, CO formation is not only caused by decomposition of carbon dioxide contained in the dielectric fluid, but also by decomposition of the nozzle material, which is typically $C_2F_4$.

According to the invention, an oxidation catalyst is arranged in the apparatus, in particular inside its housing, in particular inside its gas-tight housing, said oxidation catalyst comprising noble metal particles coated onto or embedded into a carrier for the catalytic oxidation of carbon monoxide to carbon dioxide. This catalyst thus increases the rate of oxidation of carbon monoxide to carbon dioxide by lowering the activation energy for the oxidation.

Given the further feature that the dielectric fluid also contains oxygen as a carrier gas component, carbon monoxide is readily oxidized to carbon dioxide at moderate temperature, and in any case far below 700° C., which is the temperature required for the non-catalytic oxidation of carbon monoxide.

Ultimately, the highly toxic and harmful carbon monoxide is thereby converted into the unproblematic dielectric carbon dioxide. In the case where carbon dioxide is a component of the dielectric fluid, the oxidation of carbon monoxide has the further advantage that the functionality of the dielectric fluid and thus a safe operation of the apparatus are maintained over a prolonged period.

Since the catalyst by definition is not consumed in the catalysed reaction and can thus continue to catalyse the oxidation of further quantities of carbon monoxide, relatively small amounts of catalyst are sufficient for complete oxidation of carbon monoxide over a prolonged period of time.

As mentioned, the dielectric fluid comprises a mixture of carbon dioxide and oxygen. According to particular embodiments, the dielectric fluid is at least essentially devoid of $SF_6$, thus allowing for providing a dielectric fluid having a very low GWP and an Ozone Depletion Potential (ODP) of 0.

Generally, the ratio of the molar fraction of carbon dioxide to the molar fraction of oxygen ranges from 50:50 to 100:1. According to further embodiments, the molar fraction of $O_2$ is lower than the one of $CO_2$. More specifically, the ratio of the molar fraction of carbon dioxide to the molar fraction of oxygen ranges from 80:20 to 95:5, since the presence of $O_2$ in the respective amounts allows soot formation to be prevented. More preferably, this ratio is from 85:15 to 92:8, even more preferably from 87:13 to less than 90:10, and in particular is about 89:11. In this regard, it has been found that $O_2$ being present in a molar fraction of at least 8% allows soot formation to be prevented even after repeated current interruption events with high current arcing.

Also, given the relative high amount of oxygen in the ranges specified above, a high reaction rate of the oxidation from carbon monoxide to carbon dioxide can be achieved. There is, thus, no need to add additional oxygen for the oxidation to take place, as it is the case for the technology disclosed in JP 2015 073348, which necessitates a different gas mixture to be provided in the reaction vessel than is present in the insulation space. The design of the apparatus according to the present invention is therefore much simpler and more straightforward than the one according to JP 2015 073348, which requires a separate reaction vessel and a corresponding piping system.

In the context of the present invention, the term "oxidation catalyst" relates to the actual device for catalysing CO oxidation. The term thus encompasses oxidation catalysts consisting of the catalytic material as well as catalysts which apart from the catalytic material further comprises additional components, such as a heating coil or disc, and/or a sleeve, tube or jacket in which the catalytic material is to be contained.

Typically, the oxidation catalyst comprises a sleeve, tube or jacket in which the catalytic material is contained. As the case may be, it can be preferred that a fan is provided which is designed such to create a flow of the dielectric fluid through the oxidation catalyst.

According to embodiments, the noble metal particles are made of at least one metal selected from the group consisting of: Au (Gold), Ru (Ruthenium), Rh (Rhodium), Pd (Palladium), Os (Osmium), Ir (Iridium), Pt (Platinum), and mixtures thereof. These allow catalysis of carbon monoxide oxidation to take place at about 250° C., which is much lower than the temperature at which oxidation occurs without a catalyst, i.e. about 700° C.

In particular, the temperature of catalysis of about 250° C. is substantially lower than dissociation temperatures e.g. of fluoroketones (which may occur e.g. around 550° C.) and of other organofluorine compounds mentioned in this application. Thus, catalytic oxidation of carbon monoxide can be performed in locations inside the electrical apparatus or circuit breaker, where no significant dissociation of fluoroketones or of the other organofluorine compounds mentioned in this application are incurred.

More specifically, the oxidation catalyst is a platinum group member catalyst comprising particles of a platinum group member coated onto a ceramic or metal carrier.

In more concrete terms, the oxidation catalyst can in embodiments be a Diesel Oxidation Catalyst (DOC) or can be based on the principle of a DOC.

Since a DOC is typically designed for quasi-stationary operation at gas temperatures of above 250° C., the oxidation catalyst is—in particular in case of a DOC or a DOC-based catalyst—preferably arranged in a high-temperature area of the apparatus, said high-temperature area being designed to maintain a temperature of above 250° C. over the duration of the oxidation reaction.

In embodiments, the high-temperature area is designed to maintain a temperature of below 500° C. at least over the duration of the oxidation reaction, in particular to prevent dissociation of fluoroketones or other organofluorine compounds mentioned herein in the high-temperature area.

According to particular embodiments, the apparatus of the present invention is preferably an electrical switching device, as mentioned above. The switching device comprises at least one switching chamber, which comprises at least two arcing contacts that are movable in relation to each other and define an arcing region, in which an arc is formed during a current breaking operation.

Typically, the switching chamber further comprises an exhaust volume, which is fluidly connected to the arcing region to allow the dielectric fluid heated by the arc to flow out of the arcing region in direction to the exhaust volume. In the area between the arcing region and the exhaust volume, the temperature is particularly high after a switching operation.

If relatively large currents are interrupted, the temperature is typically higher than 250° C., i.e. the temperature required for the catalysed CO oxidation to take place.

According to further embodiments, the oxidation catalyst is arranged in a high-temperature area of the switching device, said high-temperature area being in direction of the outflow of the heated dielectric fluid located between the arcing region and the exhaust volume. Due to the temperature being in this area higher than 250° C., the catalysed CO oxidation can take place efficiently. In addition, the placement of the catalyst between arcing region and exhaust volume has the further advantage that a direct contact of the catalyst with the heated dielectric fluid flowing out of the arcing region can be established. Since in the heated dielectric fluid, the amount of carbon monoxide is comparatively high, this further contributes to an efficient CO oxidation.

Additionally or alternatively, the oxidation catalyst can be arranged in an intermediate chamber delimited by an intermediate chamber wall and being located in direction of the outflow of the heated dielectric fluid between the arcing region and the exhaust volume. According to this embodiment, the oxidation catalyst is thus arranged in a so-called Hylsa system, the basic design of which has been described in EP 1 403 891. In this regard, the arrangement in a Hylsa system in either of the flow directions, i.e. on the tulip side and/or on the plug side of the contacts, is possible.

However, following low current interruption, e.g. in the course of a T10 switching scenario, the temperature of the outflowing dielectric fluid can be significantly lower and can in particular be lower than 250° C. Also, there might be cases where it is desirable to arrange the oxidation catalyst remotely from the arcing region, i.e. in an area where the temperature—irrespective of the current that it is to be interrupted—is lower than 250° C. or where a temperature higher than 250° C. is not maintained over a sufficiently long time following the switching operation.

In particular in view of these cases, further embodiments can relate to the oxidation catalyst further comprising a heater designed to generate a temperature of 250° C. at least, i.e. the temperature necessary for the catalysed CO oxidation to take place.

In embodiments, the heater is designed to generate a temperature of below 500° C., in particular to prevent dissociation of fluoroketones or other organofluorine compounds that are mentioned in this application. In other words, it is favourable to delimit the catalyst temperature to below approximately 500° C. in order to reduce or eliminate dissociation of organofluorine compounds, e.g. such as: fluoroethers, fluoroketones, fluoroolefins, fluoronitriles, and mixtures thereof.

For example, an oxidation catalyst can be used which apart from the catalyst material comprises a heating disc, both being arranged in a sleeve or jacket.

The presence of a heater has the further advantage that non-oxidized and potentially reactive gaseous impurities can be burnt inside the oxidation catalyst. If e.g. hydrocarbons are present inside the apparatus, they are efficiently oxidized to $CO_2$ and to water.

In the embodiment, where the catalyst is arranged remotely from the arcing region, there is in general no coercive flow of the switching medium—in contrast to an oxidation catalyst being arranged between arcing region and exhaust volume, where such a flow is present after a switching operation. For this embodiment, a fan is preferably provided to create a flow of the dielectric fluid and thus to convey the dielectric fluid actively through the oxidation catalyst. The oxidation catalyst according to this embodiment can further comprise a heater to generate the temperature necessary for the catalysed CO oxidation to take place.

According to further embodiments, the oxidation catalyst is therefore preferably part of a catalyst system, which apart from the oxidation catalyst further comprises a fan designed to create a flow of the dielectric fluid through the oxidation catalyst.

In order to allow for an efficient CO oxidation also at a temperature lower than 250° C., alternative oxidation catalysts can be chosen. In particular, a high CO oxidation rate at relatively low temperature can be achieved if the oxidation catalyst is a gold catalyst comprising gold particles calcinated on a metal oxide carrier, in particular an aluminum-oxide or an iron-oxide carrier. In view of an increased catalytic turnover as well as of a high stability, $CeO_2$ is preferably added to the gold catalyst.

Preferably, the oxidation catalyst comprises gold particles calcinated on a carrier based on $CeO_2$ doped with Fe atoms. In this $CeO_2/Fe_2O_3$ carrier, oxygen vacancies are present, which further improve the efficiency of the catalyst.

A particularly high catalytic performance can be achieved, if the gold particles have an average diameter of 10 nm at most, preferably 8 nm at most, more preferably 6 nm at most, most preferably 4 nm at most.

According to further embodiments, the gold catalyst further comprises a partly reducible oxide, in particular ceria ($CeO_2$) or a transition metal oxide.

For example, a gold catalyst comprising of 1% Au loaded on a $Fe_2O_3$ carrier doped with $CeO_2$ by calcination at 180° C. is able to fully oxidize carbon monoxide at −16.1° C. Full CO oxidation can be achieved even at lower temperatures, if a gold catalyst comprising 1% Au calcined onto a $Al_2O_3$/ $CeP_2$-doped $Fe_2O_3$ carrier is used, for which 100% conversion at −20.1° C. has been reported.

Since, as mentioned, some water can be generated by the oxidation of gaseous hydrocarbons present in the insulation space, it can further be preferred that additionally a desiccant is contained in the insulation space of the apparatus, in particular in the switching chamber of the switching device.

In embodiments, the desiccant is designed such to specifically adsorb water, and more preferably is selected from the group consisting of: calcium, calcium sulphate, in particular drierite, calcium carbonate, calcium hydride, calcium chloride, potassium carbonate, potassium hydroxide, copper (II) sulphate, calcium oxide, magnesium, magnesium oxide, magnesium sulphate, magnesium perchlorate, sodium, sodium sulphate, aluminium, lithium aluminium hydride, aluminium oxide, activated alumina, montmorrilonite, phosphorpentoxide, silica gel, a cellulose filter, and combinations thereof.

The present invention is further illustrated by means of the attached figures, in which the apparatus of the present invention is in the form of a circuit breaker. Specifically.

Figure 1:
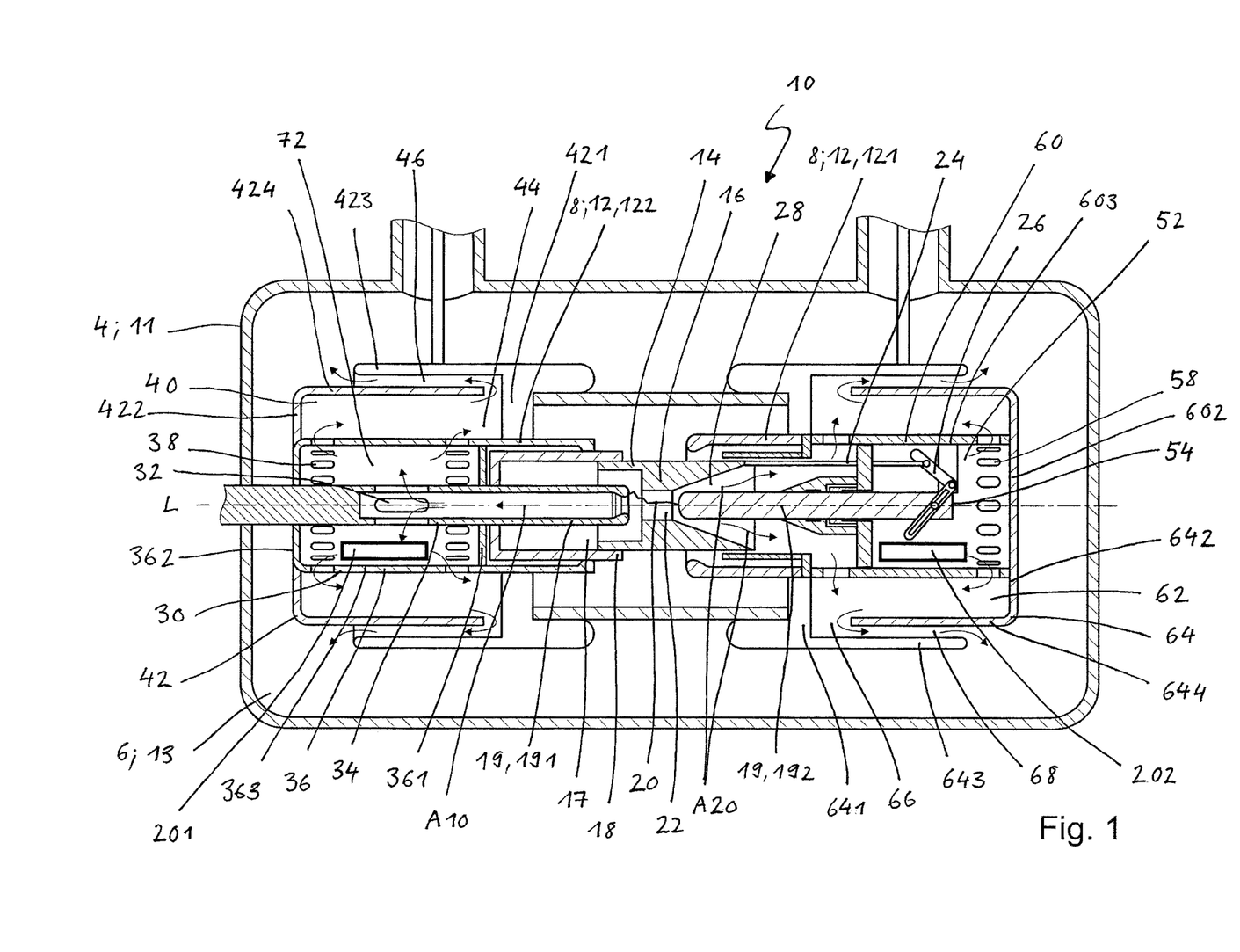
FIG. 1 shows a longitudinal section of a circuit breaker according to a first embodiment of the present invention during a current breaking operation.
Figure 2:
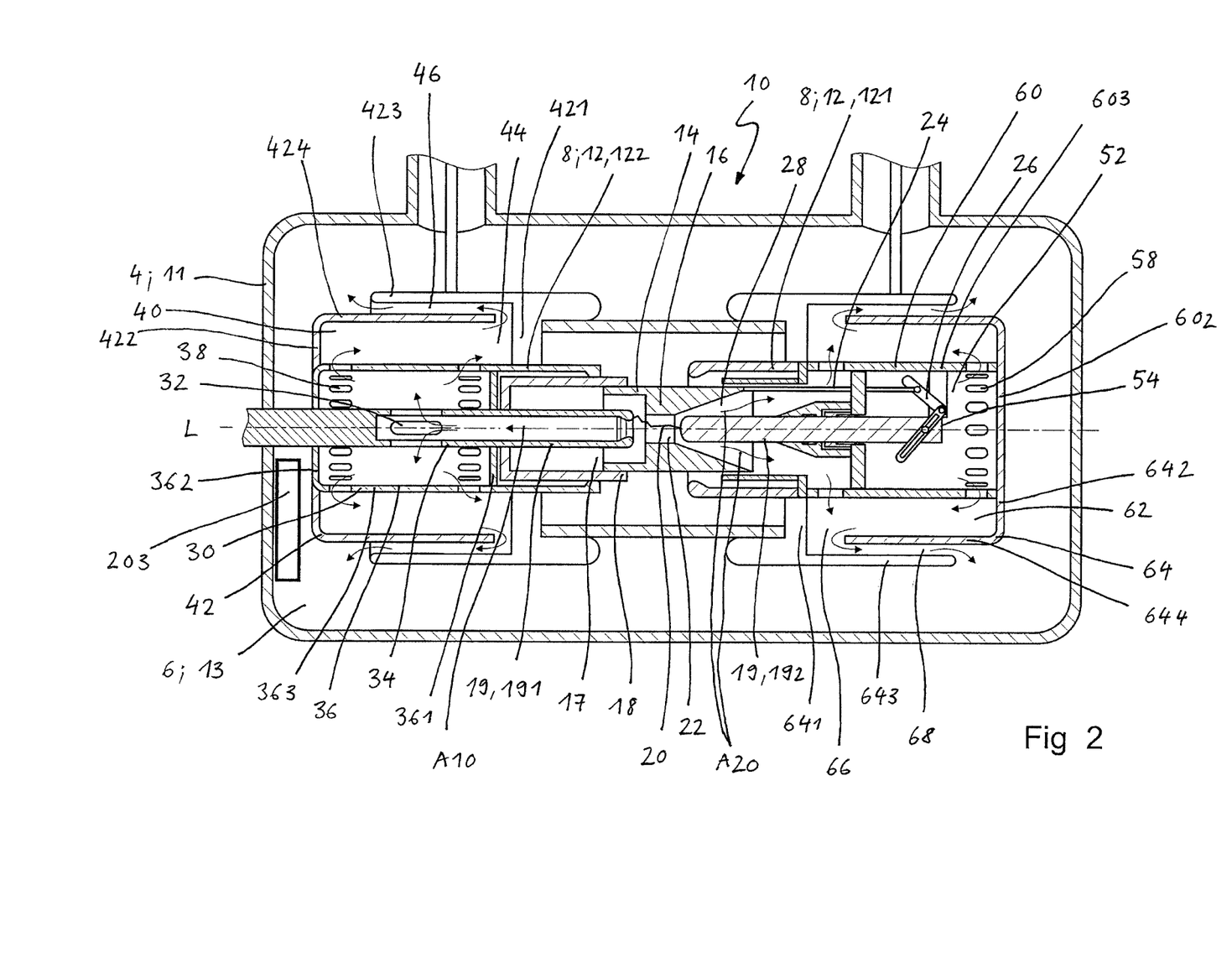
FIG. 2 shows a longitudinal section of a circuit breaker according to a second embodiment of the present invention during a current breaking operation.

As shown in FIGS. 1 to 2, the circuit breaker of the present invention comprises a switching chamber 10, which in the embodiments shown is rotationally symmetrical and extends along a longitudinal axis L. The switching chamber comprises a housing 4 in the form of a tank wall 11, which delimits an insulation space 6 in the form of a tank volume 13 and is filled with a dielectric fluid in the form of a switching gas.

The switching chamber 10 comprises electrically conductive parts 8 in the form of two nominal contacts 12 movable in relation to each other in the axial direction, specifically a main contact as a first nominal contact 121 and a contact cylinder as second nominal contact 122. The second nominal contact 122 surrounds a concentrically disposed nozzle arrangement 14 comprising a nozzle 16 and further surrounds a conducting portion 18 forming the wall of a self-blast volume 17. The nozzle arrangement 14 further surrounds two concentrically disposed arcing contacts 19, one in the form of a hollow tubular contact 191 on a "tulip side" of the circuit breaker and the other in the form of a respective pin contact 192 on a "plug side" of the circuit breaker.

In the embodiment shown, the second nominal contact 122 is designed as a movable contact, whereas the first nominal contact 121 is designed as a stationary contact. As well, both nominal contacts 121, 122 may be designed to be movable.

During a current breaking operation, the second nominal contact 122 is moved in axial direction L away from the first nominal contact 121 from a connected (or closed) state to a disconnected (or open) state.

Thereby, also the hollow tubular arcing contact 191 is moved in axial direction L away from the pin arcing contact 192 and is eventually disconnected, whereby an arc 20 is formed in the arcing region 22 located between the arcing contacts 191, 192. To this end, an actuating rod 24 is linked to the nozzle arrangement 14, said actuating rod 24 being connected to the pin arcing contact 192 by means of an angular lever 26, adapted such to pull the pin arcing contact 192 in a direction away from the hollow tubular arcing contact 191 during current breaking, thereby increasing the speed of disconnecting the arcing contacts 191, 192.

The arc 20 formed is quenched by means of a self-blasting mechanism blowing heated switching gas through the nozzle 16 and thus into the arcing region 22. The switching gas comprises carbon dioxide, which by the temperature raise of the switching gas during quenching partially dissociates into carbon monoxide. Carbon monoxide is further generated by heat-induced decomposition of the material of the nozzle 16, which is typically made of polytetrafluoroethylene (PTFE).

Following the quenching of the arc, some of the heated and pressurized switching gas flows out of the arcing region 22 through the hollow tubular arcing contact 191, whereas some switching gas flows out of the arcing region 22 in the opposite direction trough a nozzle channel 28 arranged concentrically to and extending along the pin arcing contact 192. The flow direction of the hot switching medium away from the arcing region 22 is depicted with respective arrows.

On the tulip side, i.e. on the side of the hollow tubular arcing contact 191, a first intermediate chamber 30 (or Hylsa system) is disposed concentrically with regard to the hollow tubular arcing contact 191 and at a distance from the arcing region 22. The first intermediate chamber 30 is fluidly connected with the hollow tubular arcing contact 191 by respective openings 32 provided in the wall 34 of the hollow tubular arcing contact 191. Specifically, a row of four openings 32 having a common cross section and being radially disposed over the circumference of the hollow tubular contact are provided in the embodiment shown.

The first intermediate chamber 30 is delimited by a first intermediate chamber wall 36 comprising a proximal side wall (or proximal end wall) 361 facing the arcing region 22, a distal side wall (or distal end wall) 362 arranged opposite to the proximal side wall 361, and a circumferential wall 363.

In the specific embodiment shown, two rows of radially disposed openings 38 of common (or variable) cross-section(s) are arranged in the first intermediate chamber wall 36, one in direct proximity to the proximal side wall 361 and one in direct proximity to the distal side wall 362. The openings 38 open into a first exhaust volume 40 arranged concentrically with respect to the first intermediate chamber 30.

The (first) openings 32 in the hollow tubular arcing contact 191 are arranged offset with regard to the (second) openings in the first intermediate chamber wall 36 so that the swirled gases flowing in the radial direction cannot flow further directly through the (second) openings 38 into the first exhaust volume 40. However, it can also be feasible for at least one of the (first) openings 32 in the hollow tubular contact wall 34 to be provided such that it is entirely or partially coincident with a respective (second) opening 38 in the intermediate chamber wall 36, in order to deliberately ensure a partially or completely direct flow from the hollow tubular arcing contact 191 into the first exhaust volume 40. The shape, size, arrangement and number of the (first) openings 32 and (second) openings 38, respectively, are optimally configured, and are matched to the respectively operational requirements.

The first exhaust volume 40 is delimited by an exhaust volume wall 42. In the embodiment shown, the exhaust volume wall comprises a proximal side wall (or proximal end wall) 421, a distal side wall (or distal end wall) 422, an outer circumferential wall 423, and an inner circumferential wall 424, the circumferential walls 423, 424 being displaced axially from each other.

Specifically, the inner circumferential wall 424 extends from the distal side wall 422 leaving a gap 44 between its free end and the proximal side wall 421, whereas the outer circumferential wall 423 extends from the proximal side wall 421 in a manner such that it overlaps with the inner circumferential wall 424. Thereby, an annular channel 46 is formed between the circumferential walls 423, 424, said channel 46 opening into the tank volume 13 delimited by the tank wall 11 and filled with switching gas of relatively low temperature.

Following the heating of the gas caused by the current breaking operation, a portion of the heated pressurized switching gas flows out of the arcing region 22 through the hollow tubular arcing contact 191, as mentioned above. The gas flow indicated by the arrow A10 is deflected by an approximately conical deflection device, as indicated by further arrows, into a predominantly radial direction. The gas flow passes through the (second) openings 38 into the first intermediate chamber 30, in which the switching gas is swirled. The swirled switching gas is then allowed to pass through the (second) openings 38 in the first intermediate chamber wall 36 in the radial direction into the first exhaust volume 40, as also indicated by arrows. The switching gas that has entered the first exhaust volume 40 then flows through the gap 44 and the annular channel 46 formed by the circumferential walls 423, 424 into the tank volume 13.

On the plug side, i.e. the side of the pin arcing contact 192, a second intermediate chamber 52 can be arranged, with the distal end 54 of the pin arcing contact 192 and the angular lever 26 being arranged in the interior of the second intermediate chamber 52, which is delimited by a second intermediate chamber wall 60. One row of radially disposed (third) openings 58 is arranged in the circumferential wall 603 of the second intermediate chamber 52 in direct proximity to its distal side wall (or distal end wall) 602. These (third) openings 58 open into the second exhaust volume 62.

Like the first exhaust volume 40, also the second exhaust volume 62 can be delimited by an exhaust volume wall 64 comprising a proximal side or end wall 641, a distal side or end wall 642, an outer circumferential wall 643, and an inner circumferential wall 644, the circumferential walls 643, 644 being displaced axially from each other. Also with regard to the second exhaust volume 62, the inner circumferential wall 644 extends from the distal side wall 642 leaving a further gap 66 between its free end and the proximal side wall 641, whereas the outer circumferential wall 643 extends from the proximal side wall 641 in a manner such that it overlaps with the inner circumferential wall 644. Thereby, an annular channel 68 is formed between the circumferential walls 643, 644, said channel 68 opening into the tank volume 13, as described above for the first exhaust volume 40.

During the current breaking operation, a second portion of the heated and pressurized switching gas flows through the nozzle channel 28 extending along the pin arcing contact 192, as illustrated by arrows A20. This second portion of pressurized switching gas flows partly directly into the second exhaust volume 62 by passing (fourth) openings 70 and partly into the second intermediate chamber 52 and from there into the second exhaust volume 62 by passing (third) openings 58. Thereby, the portion flowing out of the second intermediate chamber 52 is deflected in the second exhaust volume 62 by means of the inner circumferential wall 644, before flowing out into the tank volume 13 containing switching gas of relatively low temperature, as described above for the first exhaust volume 40. Like the inner circumferential wall of the first exhaust volume wall, also the inner circumferential wall 644 of the second exhaust volume wall 64 thus functions as an exhaust volume baffle.

In the switching chamber 10 of the circuit breaker shown in FIGS. 1 and 2, an oxidation catalyst 201, 202, 203 is arranged which comprises noble metal particles coated onto or embedded into a carrier for the catalytic oxidation of carbon monoxide to carbon dioxide.

In the embodiment shown in FIG. 1, a first oxidation catalyst 201 for the oxidation of carbon monoxide to carbon dioxide is arranged in the first intermediate chamber 30, whereas a second oxidation catalyst 202 is arranged in the second intermediate chamber 52. Each of the oxidation catalysts 201, 202 is thus located, in direction of the outflow of the heated switching gas, between the arcing region 22 and the respective exhaust volume 40, 62, as mentioned above. Following interruption of relatively large currents, the heated switching gas has in this area a temperature of over 250° C.; said area thus forms a high-temperature area 72 in which a temperature of over 250° C. is maintained for the CO oxidation to take place. According to this embodiment the gas flow of the outflowing switching gas is guided through the oxidation catalyst 201, 202, i.e. through or over the catalyst material matrix. Given the fact that the amount of carbon monoxide in the switching gas outflowing from the arcing region 22 and consequently through the oxidation catalyst is comparatively high, very efficient oxidation of carbon monoxide is achieved by this embodiment.

Alternatively or additionally to the arrangement in the first and/or second intermediate chamber(s), it is further possible to arrange at least one oxidation catalyst in the hollow tubular contact 191 (not shown) and/or further downstream, in particular in the first exhaust volume 40 and/or second exhaust volume 62 (not shown). In the case, where the oxidation catalyst is arranged in the exhaust volume 40 and/or 62, it can for example be arranged in proximity to the inner circumferential wall 424 or 644, respectively, or the distal side wall 422 or 642, respectively, of the respective exhaust volume 42 or 62. Additionally or alternatively, at least one oxidation catalyst can be arranged in close proximity to the outflow opening of the annular channel 46, 68 (not shown).

In the embodiment shown in FIG. 2, the oxidation catalyst 203 is arranged in the tank volume 13 and therefore remotely from. the arcing region 22. In this embodiment, the oxidation catalyst 203 further comprises a heater (not shown) designed to generate a temperature of 250° C. at least, in order to safeguard that a sufficiently high temperature is maintained for the CO oxidation to take place. In addition, a fan can be provided to create a flow of the switching gas and thus convey the switching gas actively through the oxidation catalyst 203.

While there are shown and described presently preferred embodiments of the invention, it is to be distinctly understood that the invention is not limited thereto, but may otherwise variously be embodied and practised within the scope of the following claims. Therefore, terms like "preferred" or "in particular" or "particularly" or "advantageously", etc. signify optional and exemplary embodiments only.

LIST OF REFERENCE NUMERALS 4 housing
6 insulation space
8 electrically conductive part
10 switching chamber
11 tank wall
12 nominal contacts
121; 122 first nominal contact (main contact); second nominal contact (contact cylinder)
13 tank volume
14 nozzle arrangement
16 nozzle
18 conducting portion
17 self-blast volume
19 arcing contacts
191; 192 hollow tubular arcing contact; pin arcing contact
20 arc
22 arcing region
24 actuating rod
26 angular lever
28 nozzle channel
30 first intermediate chamber
32 first openings in wall of tubular hollow contact
34 wall of tubular hollow contact
36 first intermediate chamber wall
361, 362, 363 proximal side wall or end wall, distal side wall or end wall, circumferential wall (first intermediate chamber wall)

38 second openings in the first intermediate chamber wall
40 first exhaust volume
42 first exhaust volume wall
421; 422; 423; 424 proximal side wall or end wall; distal side wall or end wall; outer circumferential wall; inner circumferential wall of first exhaust volume
44 gap
46 annular channel
52 second intermediate chamber
54 distal end of pin arcing contact
56 third openings in second intermediate chamber wall
60 second intermediate chamber wall
602; 603 distal side wall or end wall; circumferential wall of second intermediate chamber
62 second exhaust volume
64 second exhaust volume wall
641; 642; 643; 644 proximal side wall or end wall; distal side wall or end wall; outer circumferential wall; inner circumferential wall of second exhaust volume wall
66 (further) gap
68 annular channel formed by circumferential walls of second exhaust volume
70 fourth openings from nozzle channel into second exhaust volume
72 high-temperature area
201-203 oxidation catalyst

The invention claimed is:

1. An apparatus for generation, transmission, distribution and/or the usage of electrical energy, said apparatus comprising:
a housing enclosing an insulation space and an electrically conductive part arranged in the insulation space, wherein said insulating space contains a dielectric fluid comprising carbon dioxide and oxygen, in the apparatus an oxidation catalyst is arranged, a ratio of a molar fraction of carbon dioxide to a molar fraction of oxygen ranges from 50:50 to 100:1 to prevent soot formation during arcing, and the oxidation catalyst is arranged inside the insulation space of the apparatus, further the apparatus being a switching device comprising at least one switching chamber, which comprises at least two arcing contacts movable in relation to each other and defining an arcing region, in which an arc is formed during a current breaking operation, the switching chamber further comprising an exhaust volume, which is fluidly connected to the arcing region to allow the dielectric fluid heated by the arc to flow out of the arcing region in direction towards the exhaust volume,
wherein the oxidation catalyst comprises noble metal particles that are coated onto or are embedded into a carrier and are for a catalytic oxidation of carbon monoxide to carbon dioxide, and the oxidation catalyst is arranged in a high-temperature area of the switching device, said high-temperature area being located, in direction of an outflow of the heated dielectric fluid, between the arcing region and the exhaust volume,
wherein the oxidation catalyst is arranged in the high-temperature area of the apparatus, said high temperature area being designed to maintain a temperature below 500° C. over a duration of an oxidation reaction.

2. The apparatus according to claim 1, wherein the ratio of the molar fraction of carbon dioxide to the molar fraction of oxygen ranges from 80:20 to 95:5.

3. The apparatus according to claim 1, wherein the noble metal particles are made of at least one metal selected from a group consisting of: Au, Ru, Rh, Pd, Os, Ir, Pt and mixtures thereof.

4. The apparatus according to claim 1, wherein the oxidation catalyst is a platinum-group-member catalyst comprising particles of a platinum group member coated onto a ceramic or metal carrier.

5. The apparatus according to claim 1, wherein the oxidation catalyst is arranged in the high-temperature area of the apparatus, said high-temperature area being designed to maintain a temperature of above 250° C. over the duration of the oxidation reaction.

6. The apparatus according to claim 1, wherein the oxidation catalyst further comprises a heater designed to generate a temperature of at least 250° C.

7. The apparatus according to claim 1, wherein the oxidation catalyst is arranged in an intermediate chamber delimited by an intermediate chamber wall and being located, in direction of the outflow of the heated dielectric fluid, between the arcing region and the exhaust volume.

8. The apparatus according to claim 1, wherein the oxidation catalyst is a gold catalyst comprising gold particles calcinated on a metal oxide carrier.

9. The apparatus according to claim 8, wherein the gold particles have an average diameter of at most 10 nm at most.

10. The apparatus according to claim 8, wherein the gold catalyst further comprises a partly reducible oxide, in particular ceria or a transition metal oxide.

11. The apparatus according to claim 1, which further includes a desiccant contained in the insulation space; and/or that the dielectric fluid comprises one compound selected from a group consisting of: $SF_6$, an organofluorine compound, and mixtures thereof.

12. The apparatus according to claim 11, wherein the organofluorine compound selected from a group consisting of: fluoroethers, fluoroketones perfluoroketones, fluoroolefins, fluoronitriles, and mixtures thereof.

13. The apparatus according to claim 1, wherein the oxidation catalyst is part of a catalyst system, which apart from the oxidation catalyst further comprises a fan designed to create a flow of the dielectric fluid through the oxidation catalyst.

14. The apparatus according to claim 1, further comprising a circuit breaker.

15. The apparatus according to claim 1, wherein the oxidation catalyst is arranged in a manner to allow a direct contact with the insulation fluid contained in the insulation space.

16. The apparatus according to claim 1, wherein the apparatus is devoid of a reaction vessel separate from the insulation space and designed for the oxidation from carbon monoxide to carbon dioxide to take place.

17. The apparatus according to claim 1, wherein the oxidation catalyst comprises gold particles calcinated on a carrier based on $CeO_2$ doped with Fe atoms.

18. The apparatus according to claim 1, wherein the oxidation catalyst is devoid of an oxidizing agent layer containing Mn, Co, Ni, Cu, Zn, Ti, Fe, V or Cr.

19. The apparatus according to claim 1, wherein the ratio of the molar fraction of carbon dioxide to the molar fraction of oxygen ranges from 87:13 to less than 90:10.

20. The apparatus of claim 1, wherein the oxidation catalyst is a gold catalyst comprising gold particles calcinated on a metal oxide carrier defined by an aluminium oxide or an iron oxide carrier.

21. The apparatus according to claim 1, wherein the dielectric fluid comprises an organofluorine compound.

22. An apparatus for the generation, transmission, distribution and/or usage of electrical energy, said apparatus comprising:

a housing enclosing an insulation space and an electrically conductive part arranged in the insulation space, wherein said insulating space contains a dielectric fluid comprising carbon dioxide and oxygen, in the apparatus an oxidation catalyst is arranged, a ratio of a molar fraction of carbon dioxide to a molar fraction of oxygen ranges from 50:50 to 100:1 to prevent soot formation during arcing, and the oxidation catalyst is arranged inside the insulation space of the apparatus, further the apparatus being a switching device comprising at least one switching chamber, which comprises at least two arcing contacts movable in relation to each other and defining an arcing region, in which an arc is formed during a current breaking operation, the switching chamber further comprising an exhaust volume, which is fluidly connected to the arcing region to allow the dielectric fluid heated by the arc to flow out of the arcing region in direction towards the exhaust volume, wherein the oxidation catalyst comprises noble metal particles that are coated onto or are embedded into a carrier and are for a catalytic oxidation of carbon monoxide to carbon dioxide, and the oxidation catalyst is arranged in a high-temperature area of the switching device, said high-temperature area being located, in direction of an outflow of the heated dielectric fluid, between the arcing region and the exhaust volume, and wherein the oxidation catalyst further comprises a heater designed to generate a temperature of below 500° C.

* * * * *